(12) United States Patent
Boegelund et al.

(10) Patent No.: US 7,975,214 B2
(45) Date of Patent: Jul. 5, 2011

(54) SYSTEM FOR CAPTURING FRAMES AND FORM DATA

(75) Inventors: Flemming Boegelund, Frederikssund (DK); Steven Earl Hicks, Coppell, TX (US)

(73) Assignee: International Business Machines Corporation, Armonk, NY (US)

( * ) Notice: Subject to any disclaimer, the term of this patent is extended or adjusted under 35 U.S.C. 154(b) by 882 days.

(21) Appl. No.: 11/924,667

(22) Filed: Oct. 26, 2007

(65) Prior Publication Data

US 2009/0113290 A1    Apr. 30, 2009

(51) Int. Cl.
*G06F 17/00* (2006.01)

(52) U.S. Cl. ......................................................... 715/224

(58) Field of Classification Search ................... 715/221, 715/222, 205, 224, 273
See application file for complete search history.

(56) References Cited

U.S. PATENT DOCUMENTS

| | | | |
|---|---|---|---|
| 5,852,825 A | 12/1998 | Winslow | 707/6 |
| 6,021,416 A * | 2/2000 | Dauerer et al. | 715/207 |
| 6,224,048 B1 * | 5/2001 | Motamed | 270/52.02 |
| 6,247,028 B1 | 6/2001 | Torisaki | 707/507 |
| 6,894,804 B2 | 5/2005 | Nguyen et al. | 358/1.2 |
| 6,931,603 B2 * | 8/2005 | Boegelund | 715/846 |
| 7,600,183 B2 * | 10/2009 | Stern et al. | 715/243 |
| 7,712,111 B2 * | 5/2010 | Illowsky et al. | 719/328 |
| 2002/0065912 A1 | 5/2002 | Catchpole et al. | 709/224 |
| 2002/0184363 A1 * | 12/2002 | Viavant et al. | 709/224 |
| 2003/0013492 A1 * | 1/2003 | Bokhari et al. | 455/566 |
| 2003/0079041 A1 * | 4/2003 | Parrella et al. | 709/247 |
| 2003/0126219 A1 | 7/2003 | Tanimoto | 709/206 |
| 2003/0161001 A1 | 8/2003 | Ueda et al. | 358/1.15 |
| 2003/0177265 A1 | 9/2003 | Page et al. | 709/245 |
| 2003/0229847 A1 * | 12/2003 | Kim | 715/501.1 |
| 2004/0030525 A1 * | 2/2004 | Robinson et al. | 702/127 |
| 2005/0102322 A1 * | 5/2005 | Bagley et al. | 707/104.1 |
| 2007/0064018 A1 * | 3/2007 | Shoemaker et al. | 345/660 |
| 2007/0100999 A1 * | 5/2007 | Haider | 709/225 |
| 2007/0274672 A1 * | 11/2007 | Itoi | 386/46 |
| 2008/0309961 A1 * | 12/2008 | Aichi et al. | 358/1.15 |
| 2009/0018915 A1 * | 1/2009 | Fisse | 705/14 |
| 2009/0019031 A1 * | 1/2009 | Krovitz et al. | 707/5 |
| 2009/0138466 A1 * | 5/2009 | Henry et al. | 707/5 |
| 2010/0227550 A1 * | 9/2010 | Chang et al. | 455/39 |
| 2011/0041168 A1 * | 2/2011 | Murray et al. | 726/7 |

OTHER PUBLICATIONS

Cao et al., Generating Web-based User Interfaces for Diagramming Tools, ACM 2005, pp. 63-72.*
Lie, Abstraction Levels in Web Document Formats, Google 2003, pp. 120-127.*
Chester et al., Getting Computers to See Information Graphics so Users Do Not Have to, Google 2005, pp. 660-668.*

\* cited by examiner

*Primary Examiner* — Cong-Lac Huynh
(74) *Attorney, Agent, or Firm* — David A. Mims, Jr.; Mark Vallone; Robert V. Wilder

(57) ABSTRACT

A method, medium and implementing processing system are provided for book marking a combination of frame URLs within a frameset and allowing the sharing on multiple PCs the saved form data that may have been filled in. The system uses an image as a hotspot, containing a complex target destination in the form of an XML structure with multiple URLs for multiple frames as well as captured form data. This system combines file types such as XML and JPG, e.g. as in sample file name 'MyCapturedFramesAndFormData.XML.JPG' or 'MyCapturedFramesAndFormData.XML.GIF'. This combination provides a surprising effect compared to the prior systems, namely, launching the image in an enhanced web browser or in a web browser containing a new plug-in displays the frame just as it was when saved.

20 Claims, 4 Drawing Sheets

SYSTEM FOR CAPTURING FRAMES AND FORM DATA

RELATED APPLICATIONS

Subject matter disclosed and not claimed herein is disclosed and claimed in related co-pending application, Ser. No. 11/924,684, which is assigned to the assignee of the present application.

FIELD OF THE INVENTION

The present invention relates generally to information processing systems and more particularly to a methodology and implementation for saving and retrieving displayed frames and data.

BACKGROUND OF THE INVENTION

Currently, when a user browses the Internet and wants to bookmark a website using 'frames', it is not possible to bookmark the combination of frame URLs within the frameset as presented on the user's display. With known bookmarking technology the user can only bookmark individual URLs, either for a frame or for the entire frameset.

Further, when a user browses the Internet and wants to 'bookmark', or, in other words, 'save' form data that may have been filled into the displayed form, the data cannot be shared among multiple users on multiple PCs. Using existing form data technology, the user can only re-use form data on the same PC where it was first captured. Current systems relate simple universal resource locators (URLs) with a specific image file. The URL and the image are stored separately on a user's personal computer (PC) system and the system does not allow the capture of specific frames or form data.

Thus, there is a need for a system which enables a user to selectively save and retrieve both frame information as well as data which are input to forms presented on a user display device.

SUMMARY OF THE INVENTION

A method, medium and implementing processing system are provided for book marking a combination of frame URLs within a frameset and allowing the sharing on multiple PCs the saved form data that may have been filled in. The system uses an image as a hotspot, containing a complex target destination in the form of an XML structure with multiple URLs for multiple frames as well as captured form data. This system combines file types such as XML and JPG, e.g. as in sample file name 'MyCapturedFramesAndFormData.XML.JPG' or 'MyCapturedFramesAndFormData.XML.GIF'. This combination provides a surprising effect compared to the prior systems, namely, launching the image in an enhanced web browser or in a web browser containing a new plug-in displays the frame just as it was when saved.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

The various methods discussed herein may be implemented within a computer or other communication system which includes processing means, memory, updateable storage, input means and display means. Since the individual components of a system which may be used to implement the functions used in practicing the present system are generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention. Although the invention is illustrated in the context of a personal computer system, it is understood that wireless cellular or other wireless systems may also be implemented to achieve the beneficial functional features described. Further, it is understood that the principles of the invention may be implemented in any of many available and future computer and communication devices and systems.

In accordance with the present invention, a system, which may be in the form of a web browser plug-in, uses an XML structure to store multiple URLs for framesets as well as data entered into any number of forms in any number of frames. The XML structure is stored inside an image representing the website. XML is appended to the JPG or other graphics file as is hereinafter set forth in detail.

When loading an image representing the website, for example, the web browser plug-in extracts the XML from the image and uses the XML to restore the original website, with the captured individual frames as well as captured form data. Each frame has been automatically preset and form data has been pre-filled. The captured amount of scrolling has also been automatically restored.

The file type for the graphical image in the example contains the string ".XML" as well as the normal file type for the image itself, e.g. ".JPG". This allows the browser plug-in code to discover the imbedded XML when the graphical image is selected and/or loaded into the browser application.

For example the entire file name for the graphical image may be "MyCapturedFramesAndFormData.XML.JPG". This single mixed-format file can be shared amongst multiple users. For instance user A might fill in all the required fields for booking an airline flight and save the image. The saved file could be sent to user B (for example as an email attachment). User B then has the option of making changes, or submitting the booking as is, including the form data that had been filled-in by user A.

Figure 1:
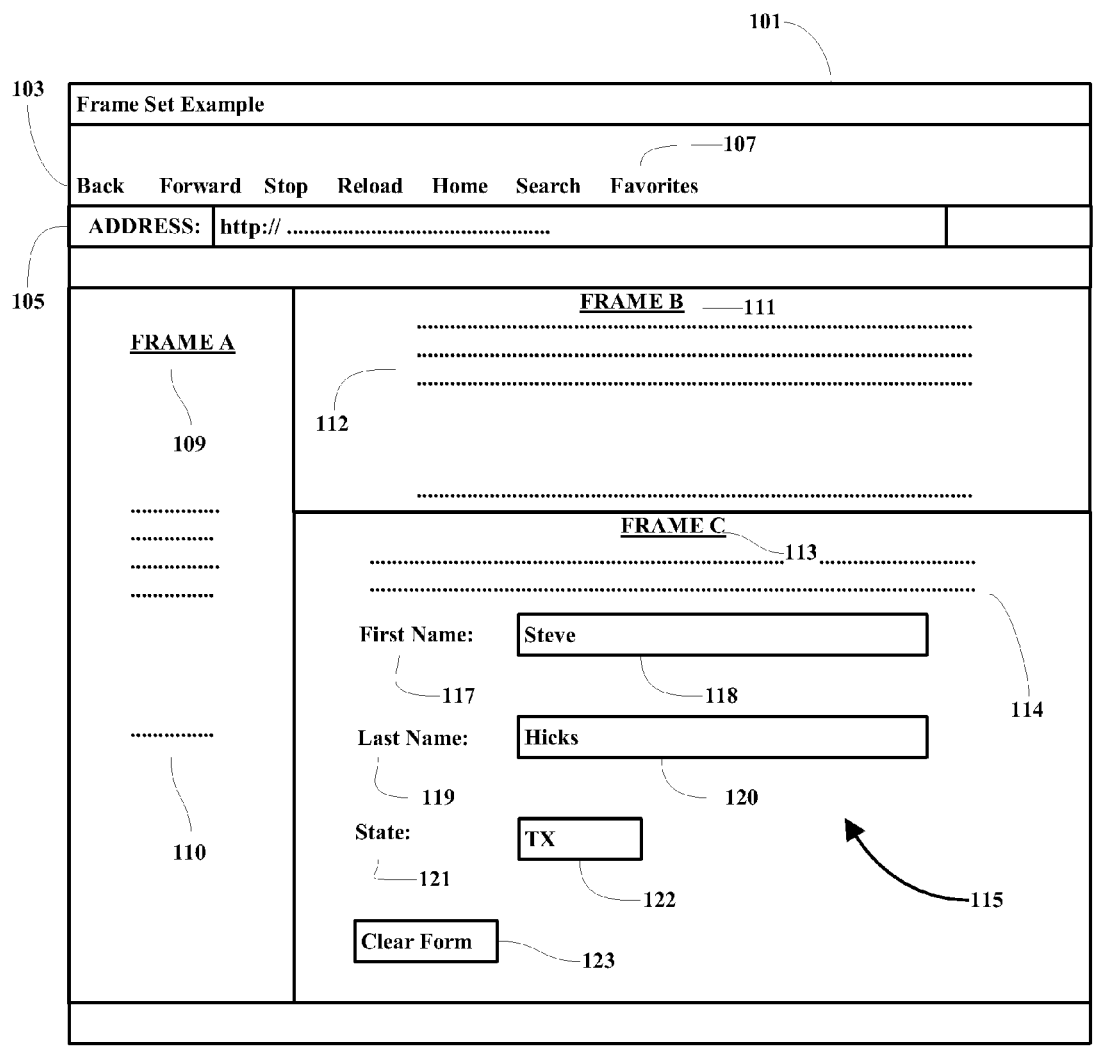
FIG. 1 is an illustration of an exemplary browser screen showing several exemplary frames and data input to one of the frames.

With specific reference to the illustrations presented in the drawings, FIG. 1 shows an exemplary browser screen having several exemplary frames and data input to one of the frames. In the example, a browser display screen 101 includes a browser menu bar 103 which further includes various user selectable browser functions including a "Favorites" function 107. Also shown is an "ADDRESS" field 105 where a user may enter a selected URL address of a particular website which the user wishes to access through an interconnection network such as the Internet.

The FIG. 1 example also shows three frames 109, 111 and 113 being displayed on the user's display screen 101. Frames A 109 and B 111 may include information 110 and 112, respectively, of interest to the user, while Frame C 113, in the example, includes a fill-in form 115 to which the user may input particular data called for by the form. In the example, in addition to other information 114, Frame C 113 includes input field designators 117, 119 and 121 which call for the input of a first name in block 118, a last name in block 120 and a State in block 122. Frame C 113 also includes a "Clear Form" selection 123 by which the user is enabled to clear all information from the form displayed in Frame C 113.

Figure 2:
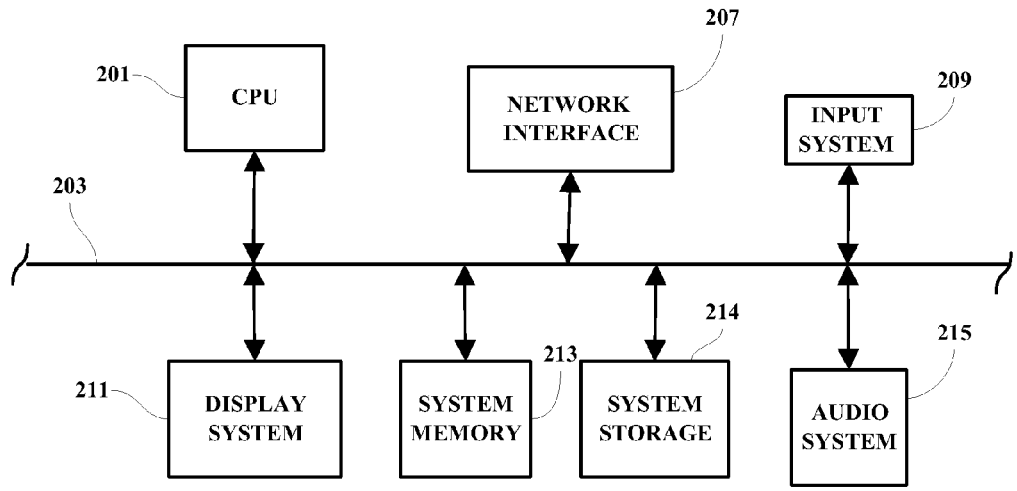
FIG. 2 is a block diagram showing several of the major components of a user computer system which may be used in conjunction with the present invention.

FIG. 2 illustrates a block diagram showing several of the major components of a user computer system which may be used in conjunction with the present invention. As shown, a user computer or other communication device usable for accessing the Internet for example, includes at least one central processor unit or CPU 201 which is connected to a main bus 203. Also connected to the main bus 203 is a network interface 207 for connecting through the Internet to selected URLs, and an input system 209. The input system includes a keyboard or keypad (as on a wireless implementation) as well as a mouse (as on a personal computer implementation). A display system 211, system memory 213, system storage 214 and an optional audio system 215 which may also be included and connected to the main bus 203. Other devices and systems may be included and connected to the main bus 203 depending upon the particular application. As illustrated, the system shown in FIG. 2 is operable to run an Internet browser program to access selected websites by connecting to selected URLs through an Internet connection.

Figure 3:
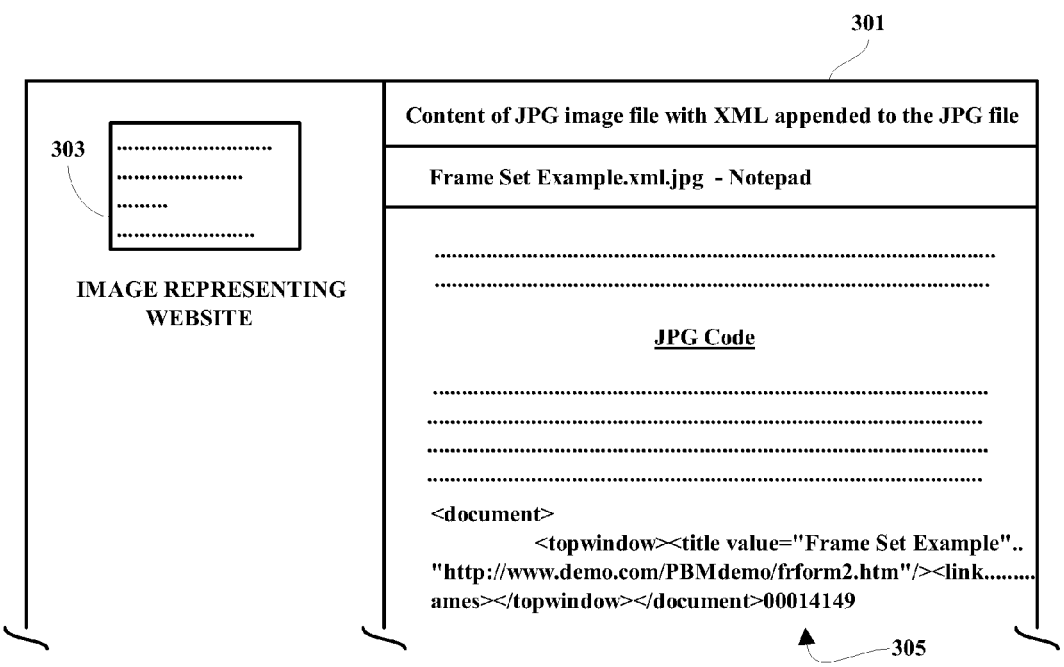
FIG. 3 is an illustration showing an XML reference appended to a JPG file in accordance with the present system.

FIG. 3 shows the content of a JPG image file 301 with an image 303 representing the website and XML 305 appended to the JPG file. The XML structure is stored inside the image 303 representing the website. When loading the image 303 representing the website for example, the web browser which is enhanced with an implementation of the present invention, extracts the XML from the image and uses the XML to restore the original website, with the captured individual frames as well as captured form data to provide the display as illustrated in FIG. 1.

Figure 4:
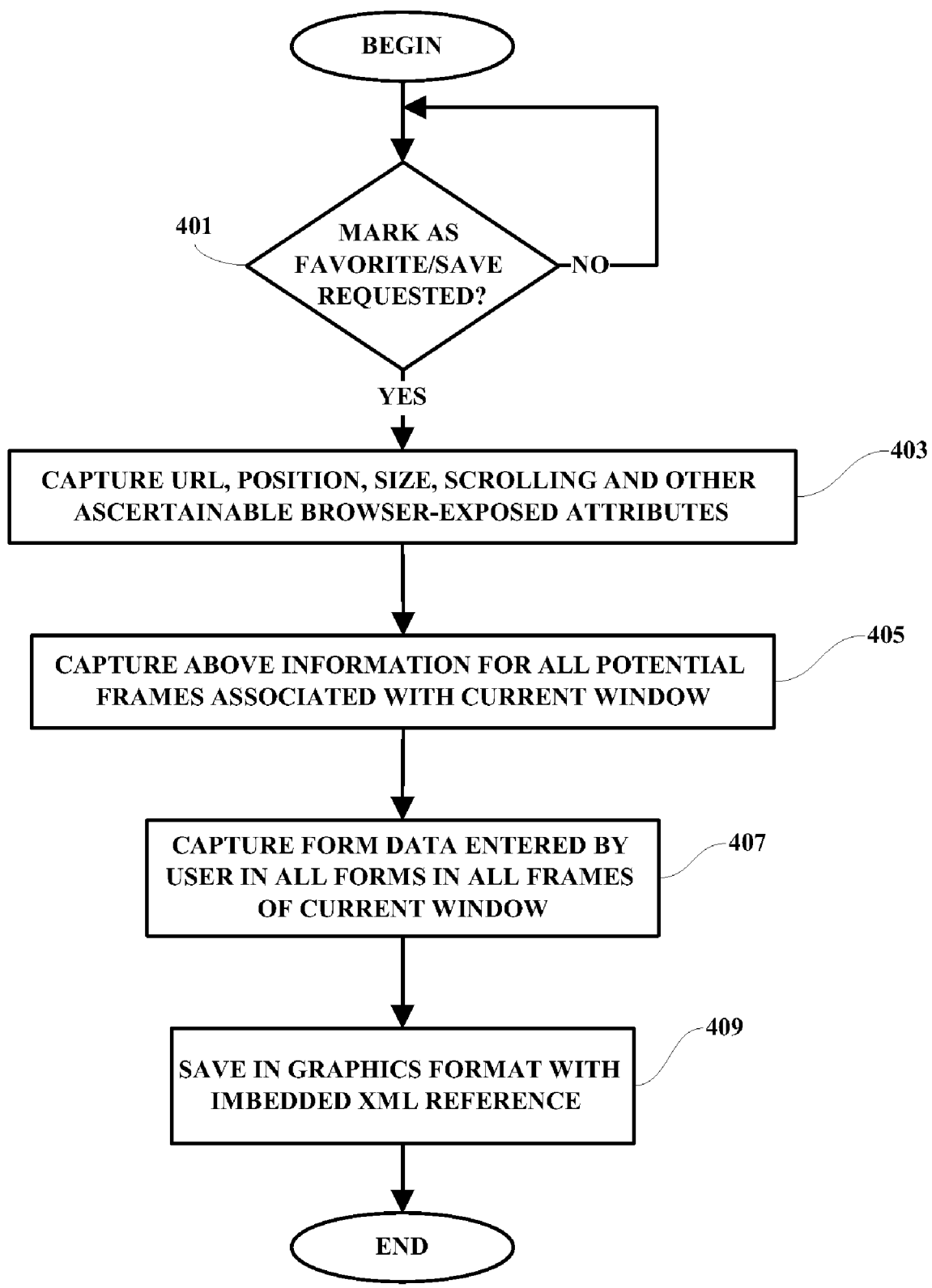
FIG. 4 is a flow chart illustrating an exemplary operation of one processing function implemented in accordance with the present system.

FIG. 4 illustrates a flow chart for an exemplary operation of one processing function implemented in accordance with the present invention. More specifically, when a user, for example, has displayed a browser screen such as shown in FIG. 1, the user is enabled to select 401 a "Save" or "Favorites" function, and the URL, position and size information and other ascertainable browser-exposed attributes of the displayed screen are captured 403 for all potential frames 405 displayed in the current window. Also, the form data which had been entered by the user are also captured 407 for all frames of the current window. Next, all of the above captured information is saved in graphics format 409 with an embedded XML reference at the end of the graphics file.

Figure 5:
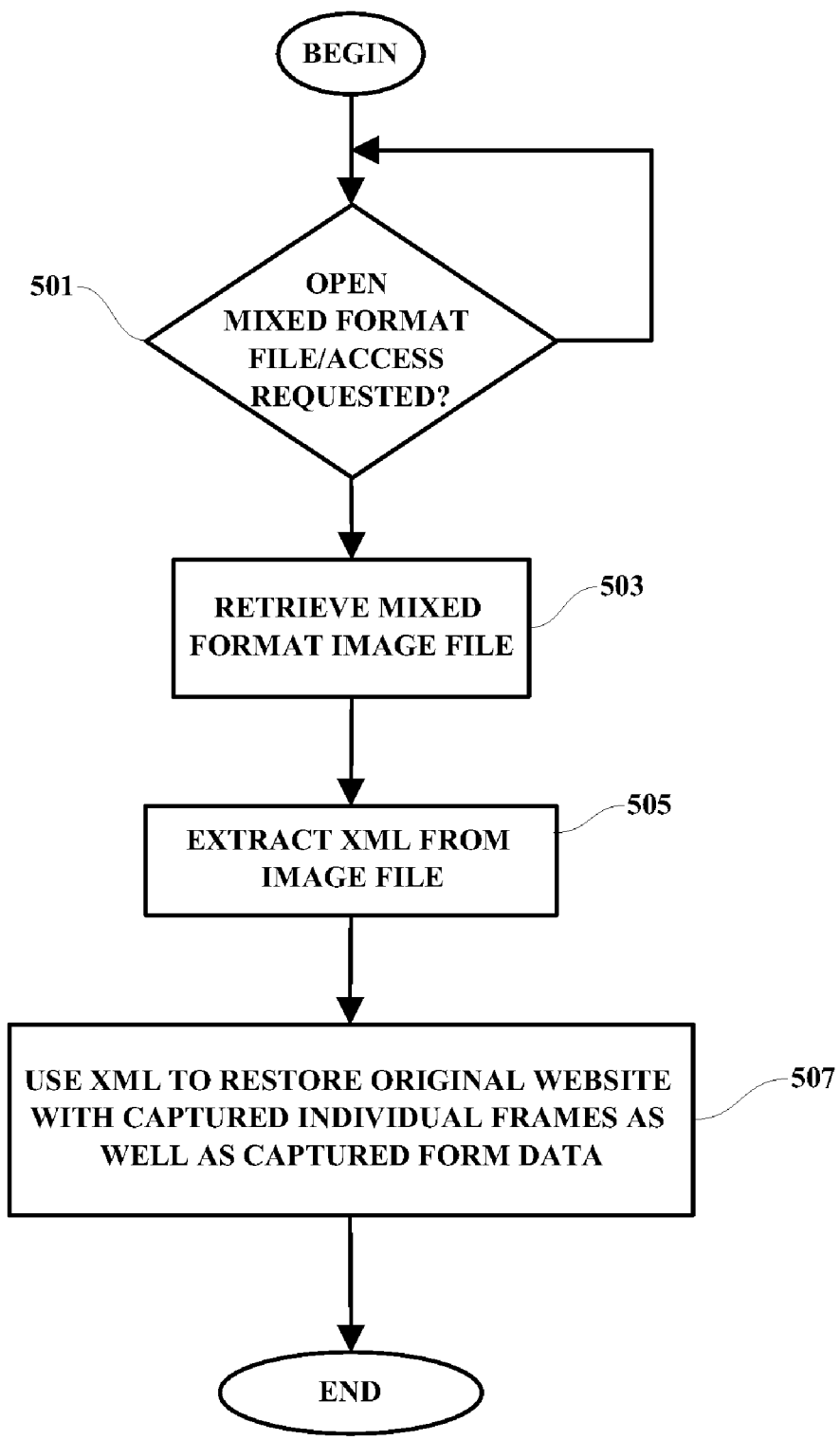
FIG. 5 is a flow chart illustrating an exemplary operation of a second processing function implemented in accordance with the present system.

FIG. 5 illustrates a flow chart for an exemplary operation of a second processing function implemented in accordance with the present invention. More specifically, when a user requests to open a file 501 which may be a file previously created by the user or which may have been received from another user as an attachment to an email for example, the mixed format (XML/Graphics) image file is retrieved 503 and the appended XML is extracted 505 and used to restore the original website 507 with captured individual frames as well as captured input form data. The graphics code may be any of many available including but not limited to JPG or GIF. An exemplary listing of the XML code for the example shown in FIG. 1, is as follows:

```
<?xml version="1.0" encoding="utf-8" ?>
<document>
    <topwindow>
        <title value="Frame Set Example" />
        <url value="http://www.demo.com/PBMdemo/frameset.htm" />
        <scrollTop value="0" />
        <scrollLeft value="0" />
        <frames>
            <count value="3" />
            <frame name="noname">
                <url
                    value= "http://www.demo.com/PBMdemo/frametoc.htm
                    " />
                <scrollTop value="0" />
                <scrollLeft value="0" />
            </frame>
            <frame name="toptoc">
                <url
                    value="http://www.demo.com/PBMdemo/formtoc.htm"
                    />
                <scrollTop value="30" />
                <scrollLeft value="0" />
            </frame>
            <frame name="outer">
                <url
                    value="http://www.demo.com/PBMdemo/frform4.htm"
                    />
                <scrollTop value="95" />
                <scrollLeft value="0" />
                <form id="">
                <field name="first_name">
                    <nodename value="INPUT" />
                    <field value="Steve" />
                </field>
```

```
            -   <field name="last_name">
                    <nodename value="INPUT" />
                    <field value="Hicks" />
                </field>
            -   <field name="state" >
                    <nodename value="INPUT" />
                    <field value="TX" />
                </field>
            -   <field name="">
                    <nodename value="INPUT" />
                    <field value="Clear Form" />
                </field>
            </form>
        </frame>
    </frames>
  </topwindow>
</document>
```

It is understood that the above code listing is only one example of an implementation of the present invention and that there are many code and other implementations which may be constructed in order to accomplish the desirable results attainable through the use of the present invention.

In the example, the file type for the graphical image (see FIG. 3) contains the string "XML" as well as the normal file type for the image itself, e.g. "JPG". This allows the browser plug-in of the present invention to discover the embedded XML when the graphical image is selected and/or loaded into the browser. For example, the entire file name for the graphical image could be "MyCapturedFramesAndFormData.XML.JPG". This single mixed-format file can be shared amongst multiple users. For instance, user A might fill in all the required fields for booking an airline flight and then save the image. User A could then send or transmit the image or single mixed-format file to user B, for example, as an email attachment, and user B will then have the option of making changes or submitting the booking as is.

The method, system and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored in any media, including portable or fixed, volatile or non-volatile memory media device, including CDs, RAM and "Flash" memory, or other semiconductor, optical, magnetic or other memory storage media from which it may be loaded and/or transmitted into other media and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing information displayed on a user display device, said information including at least one displayed frame, said displayed frame including both a displayed form for receiving user input data, and user data input to said form, said method comprising:

saving information defining said displayed form in a first file-type format;
saving said user input data in a second file-type format; and
combining content of said first file-type format with content of said user input data in said second file-type format into a single mixed format file, said single mixed format file including file-type designators for said first file-type and said second file-type.

2. The method as set forth in claim 1 wherein one of said first and second file-type formats is a graphics file-type format.

3. The method as set forth in claim 2 wherein said graphics file-type is a "JPG " file-type.

4. The method as set forth in claim 2 wherein said graphics file-type is a "GIF" file-type 5. The method as set forth in claim 1 wherein one of said first and second file-type formats is a text processing file-type.

6. The method as set forth in claim 5 wherein said text processing file-type is an "XML" file-type 7. The method as set forth in claim 1 and further including storing said single mixed format file on a user storage device whereby said single mixed format file is retrievable by said user storage device.

8. The method as set forth in claim 1 and further including transmitting said single mixed format file from a first computer system to a second computer system.

9. A computer program product comprising a computer-readable, tangible storage device(s) and computer-readable program instructions stored on the computer-readable, tangible storage device(s), the computer-readable program instructions, when executed by a processor, being operable for implementing a method for processing information displayed on a user display device, said information including at least one displayed frame, said displayed frame including both a displayed form for receiving user input data, and user data input to said form, said method comprising:

saving information defining aid displayed form in a first file-type format;
saving said user input data in a second file-type format; and
combining content of in said first file-type format with content of said user input data in said second file-type format into a single mixed format file, said single mixed format file including file-type designators for said first file-type and said second file-type.

10. The product as set forth in claim 9 wherein one of said first and second file-type formats is a graphics file-type format.

11. The product as set forth in claim 10 wherein said graphics file-type is a "JPG" file-type.

12. The product as set forth in claim 10 wherein said graphics file-type a "GIF" file-type.

13. The product as set forth in claim 9 wherein one of said first and second file-type formats is a text processing file-type.

14. The product as set forth in claim 13 wherein said text processing file-type is an "XML" file-type.

15. The product as set forth in claim 9 wherein said program signals are further effective for storing said single mixed format file on a user storage device whereby said single mixed format file is retrievable by said user storage device.

16. The product as set forth in claim 9 wherein said program signals are further effective for transmitting said single mixed format file from a first computer system to a second computer system.

17. A system for processing information displayed on a user display device, said information including at least one displayed frame, said displayed frame including both a displayed form for receiving user input data, and user data input to said form, said method comprising:

means for saving information defining said displayed form in a first file-type format;

means for saving said user input data in a second file-type format; and means for combining content of said first file-type format with content of said user input data in said second file-type format into a single mixed format file, said single mixed format file including file-type designators for said first file-type and said second file-type.

18. The system as set forth in claim 17 wherein one of said first and second file-type formats is a graphics file-type format.

19. The system as set forth in claim 17 wherein one of said first and second file-type formats is a text processing file-type.

20. The system as set forth in claim 17 and further including means for transmitting said single mixed format file from a first computer system to a second computer system.

* * * * *